United States Patent [19]

Koch et al.

[11] Patent Number: 4,572,239

[45] Date of Patent: * Feb. 25, 1986

[54] HIGH PRESSURE BALL VALVE

[75] Inventors: Ulrich H. Koch, Bainbridge Twp., Cuyahoga County; Peter C. Williams, Cleveland Heights; Gilbert F. Lutz, Chesterland, all of Ohio

[73] Assignee: Whitey Co., Highland Heights, Ohio

[*] Notice: The portion of the term of this patent subsequent to Oct. 30, 2001 has been disclaimed.

[21] Appl. No.: 648,132

[22] Filed: Sep. 7, 1984

Related U.S. Application Data

[63] Continuation of Ser. No. 297,220, Aug. 28, 1981, Pat. No. 4,479,513.

[51] Int. Cl.[4] .......................... F16K 5/06; F16K 25/00
[52] U.S. Cl. .............................. 137/625.47; 137/312; 251/172; 251/174; 251/214; 251/286
[58] Field of Search ............... 251/172, 174, 315, 286, 251/214; 137/312, 625.47

[56] References Cited

U.S. PATENT DOCUMENTS

| | | | |
|---|---|---|---|
| 2,383,983 | 9/1945 | Melichar | 251/113 |
| 2,558,260 | 6/1951 | Maky | 251/113 |
| 2,628,060 | 2/1953 | Parker | 251/113 |
| 2,661,926 | 12/1953 | Resek | 251/113 |
| 2,751,185 | 6/1956 | Shand | 251/172 |
| 2,796,230 | 6/1957 | Grove et al. | 251/172 |
| 2,916,254 | 8/1959 | Wendell | 251/172 |
| 2,932,311 | 4/1960 | Scherer | 137/246.2 |
| 2,962,039 | 11/1960 | Shand et al. | 137/219 |
| 3,047,007 | 7/1962 | Lunken | 137/315 |
| 3,076,631 | 2/1963 | Grove | 251/173 |
| 3,096,965 | 7/1963 | Margus et al. | 251/170 |
| 3,107,685 | 10/1963 | Scaramucci | 137/327 |
| 3,266,769 | 8/1966 | Shand | 251/172 |
| 3,357,679 | 12/1967 | Gulick | 251/172 |
| 3,371,907 | 3/1968 | Scaramucci | 251/175 |
| 3,379,410 | 4/1968 | Stewart, Jr. | 251/359 |
| 3,385,313 | 5/1968 | Okada | 137/315 |
| 3,472,270 | 10/1969 | Masheder | 137/315 |
| 3,497,176 | 2/1970 | Priese | 251/172 |
| 3,521,855 | 7/1970 | Jensen | 251/172 |
| 3,698,687 | 10/1972 | Kitamura | 251/315 |
| 3,771,545 | 11/1973 | Allen | 137/315 |
| 3,794,291 | 2/1974 | Suyama | 251/171 |
| 4,084,785 | 4/1978 | Herbert et al. | 251/172 |
| 4,099,543 | 7/1978 | Mong et al. | 137/625.22 |
| 4,151,855 | 5/1979 | Levin et al. | 137/15 |
| 4,266,566 | 5/1981 | Kacal et al. | 137/316 |

FOREIGN PATENT DOCUMENTS 507775 12/1951 Belgium .
658229 7/1928 France .

*Primary Examiner*—Arnold Rosenthal
*Attorney, Agent, or Firm*—Fay, Sharpe, Fagan, Minnich & McKee

[57] ABSTRACT

A ball valve designed for high pressure shut-off at fluid pressures approaching the ultimate compressive stress of plastic annular seat rings which are employed. The ball member is trunnion mounted in order to carry the total force of the shut-off pressure and the seat rings are disposed in seat ring carriers. Each seat ring includes a spherical ball engaging surface having a radius slightly smaller than the radius of the ball. Each carrier is continuously urged toward the ball by a plurality of disc springs in order that the seat ring engaging surfaces will be in continuous sealing engagement with the ball surface. The seat ring engaging surfaces are configured so that at least the areas thereof located adjacent the outer diameters will be first to sealingly engage the ball. The valve components are configured and dimensioned to limit the effective area on which fluid pressure may act in urging the seat rings into ball contact for thus controlling compressive stresses which may be exerted on the plastic seat ring material. Also, fluid pressure urges the seat rings toward the ball to enhance sealing engagement with the ball regardless of the position of each seat ring upstream or downstream of the ball from the source of fluid pressure and also with the valve in the open position. The inventive concept involved may advantageously be employed in a variety of valve bodies to accommodate a plurality of fluid shut-off applications.

17 Claims, 8 Drawing Figures

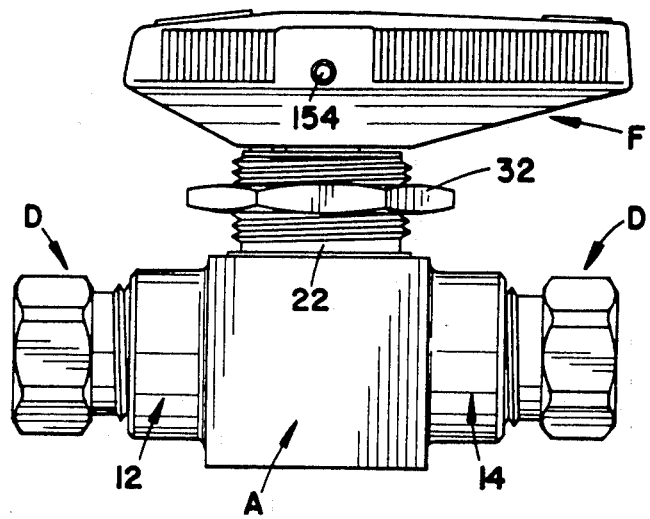
FIG. 1
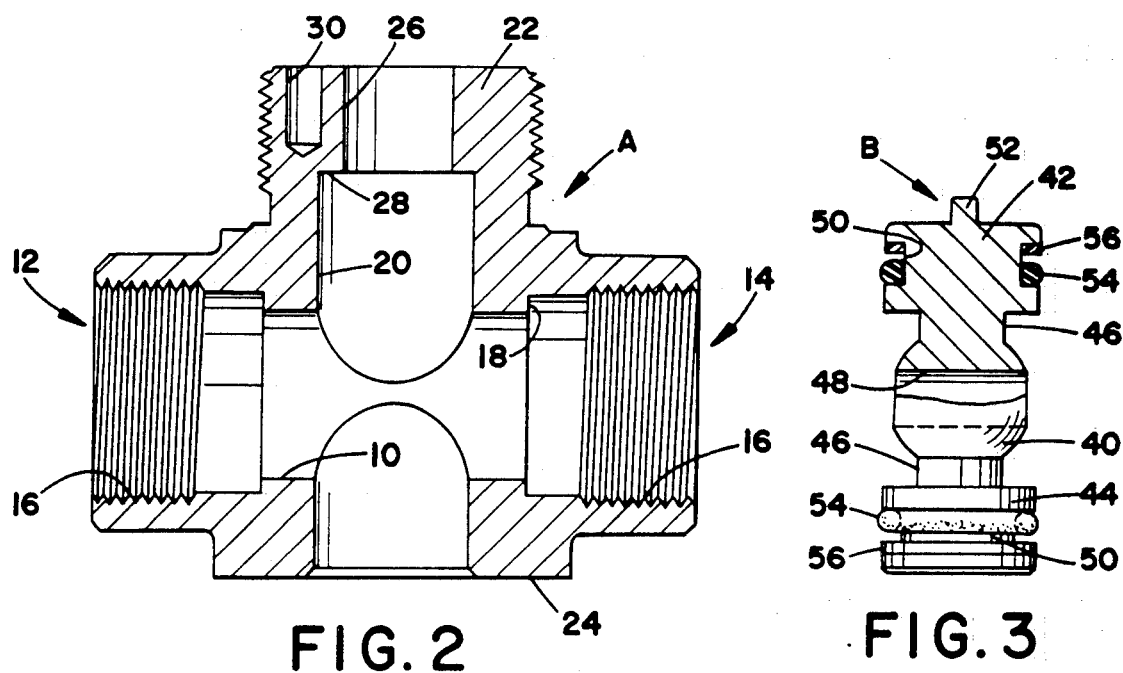
FIG. 2
FIG. 3
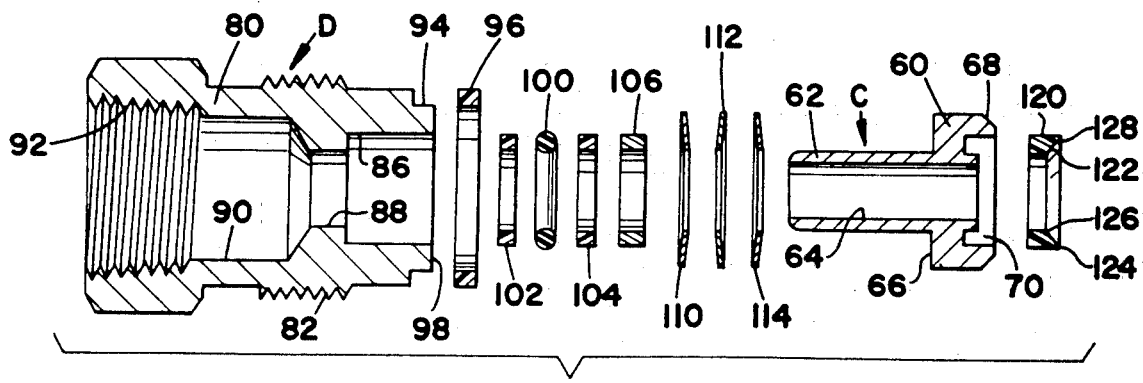
FIG. 4

HIGH PRESSURE BALL VALVE

This is a continuation of co-pending application Ser. No. 297,220 filed on Aug. 28, 1981 now U.S. Pat. No. 4,479,513, issued 10-30/84.

BACKGROUND OF THE INVENTION

This invention relates to the valve art and more particularly to ball valves.

The invention is particularly applicable to a new high pressure ball valve and will be described with particular reference thereto. However, it will become readily apparent to those skilled in the art that the invention is capable of broader applications and could be adapted to use in other types and styles of valves.

Typically, ball valve constructions in commercial use employ annular seats or seat rings formed of a plastic material. For large ball valves or for ball valves specifically designed for high pressure use (above approximately 2500 psi), the ball member is usually trunnion supported with these valve seats or seat rings having the capability of floating and being pressure activated to seal against the ball. However, in such large size and high pressure ball valves, some steps must be taken to limit the amount of fluid pressure which will act on the seats to prevent the imposition of destructively high compressive stresses thereagainst.

Therefore, and in order to eliminate compressive stresses of a magnitude which may severely damage or destroy the seats or seat rings, it has become necessary to employ pressure controlled seats in conjunction with a bearing or trunnion supported ball. While some valve constructions of this type are known in the art, the specific constructions and operational details thereof have not satisfactorily met the needs of industry. In particular, some prior designs have involved very sophisticated and/or cumbersome structures which cause production difficulties and add to the valve costs. Other prior designs of this type are for special or limited applications and are not adapted to general high pressure shut-off applications. Still other prior high pressure valves have involved constructions which, after relatively short periods of use, would not properly function and allowed destructive forces to be imparted to the valve seats.

It has, therefore, been desired to develop a high pressure ball valve which would overcome the foregoing problems. Such a design would desirably utilize a trunnion mounted ball with plastic seats, be adaptable to use in a wide range of applications or environments and be effective for a large number of valve cycles. The present invention contemplates a new and improved high pressure ball valve construction which is deemed to meet all of the foregoing needs and others.

BRIEF DESCRIPTION OF THE INVENTION

The present invention is directed to a high pressure ball valve which employs a trunnion mounted ball member to carry the total force of the system shut-off pressure. Plastic seat rings carried by seat ring carriers are continuously urged by spring biasing means into sealing engagement with the ball member. The valve components and relationships therebetween are specifically designed to limit the effective area on which fluid pressure may act in order to control compressive stresses exerted on the plastic seat rings.

More particularly in accordance with the invention, the valve includes a body having a cylindrical first flow passageway extending therethrough and a cylindrical central passageway communicating with the first passageway in a direction generally normal thereto. A valve closure member is positioned in the central passageway and mounted for selective rotation about the central passageway axis. This closure member has a spherical or ball portion disposed in the first passageway and a pair of cylindrical portions or trunnions disposed on opposite sides of the ball portion. The ball portion includes a fluid passage therethrough and one of the trunnions includes means for connecting the valve closure member to external control means. A pair of radially inward extending annular shoulders are located in the first passageway on generally opposite sides of the ball portion and spaced at generally equal distances therefrom, each shoulder being circumferentially continuous and facing the ball portion. A pair of seat ring carriers are disposed in the first passageway with each carrier including an axial fluid flow opening therethrough and a radially outward extending surface facing an associated one of the shoulders. The carriers each further include an annular seat ring receiving groove facing the closure member ball portion and a cylindrical tail portion extending axially of the first passageway away from the closure member in radially spaced relation to a cylindrical seal chamber. A plurality of partially stressed disc springs are interposed between each shoulder and the radial surface of the associated carrier for urging the carriers axially of the first passageway toward the ball portion. A deformable annular seat ring is closely received in the seat ring receiving groove of each carrier with each seat ring including a continuous ball portion engaging surface. In its unstressed condition, this engaging surface has a spherical conformation of a radius smaller than the radius of the ball portion. The seat ring engaging surfaces are urged into sealing contact with the ball portion under the influence of the disc springs with such sealing contact occurring at least at a diameter across the engaging surfaces which is smaller than the diameter across the associated seal chamber. Seal means is interposed between each carrier tail portion and the associated seal chamber with this seal means including at least one annular seal ring adapted for axial shifting between defined limits in response to fluid pressure exerted thereagainst. Finally, a control means is disposed in operative communication with the valve closure member connecting means to accommodate selective rotation of the closure member for moving the ball portion fluid passage between valve opened and closed conditions. The valve construction limits an annular area on which fluid pressure may at any time act for urging the seat rings toward the ball portion in either the valve opened or closed condition to a maximum which is related to the area of sealing contact between the seat ring engaging surfaces and the ball portion.

In accordance with another aspect of the invention, each seat ring engaging surface contacts said ball portion by an annular engaging band. This band has an outer diameter greater than the outside diameter of the associated carrier tail portion and an inside diameter which is less than the diameter of the associated seal chamber. The precise relationship between the annular fluid pressure area and the annular engaging band is determined by the maximum fluid shut off pressure and the desired maximum compressive stress to be placed on the seat ring material. The lesser the radial thickness of the annular fluid pressure area, the lesser the compressive stress exerted on the seat ring material.

According to a further aspect of the invention, the valve closure member is located and retained in the valve body central passageway by the seat rings. In addition, the closure member is pressure balanced in the central passageway so that it will not be urged outwardly therefrom by fluid forces.

In accordance with another aspect of the invention, the shoulders in the first passageway and the seal chambers are defined by removable end fittings received in the first passageway.

According to another aspect of the invention, the control means comprises an operating stem rotatably received in the central passageway and having an outer end disposed outwardly of the valve body. The stem includes a radially outward extending circumferential flange adjacent the stem inner end cooperable with a radially inward extending flange in the central passageway to prevent stem withdrawal in the direction of the stem outer end. In the preferred arrangement, a stem bearing is advantageously interposed between the stem and central passageway shoulders and a control handle is secured to the stem outer end to accommodate valve closure member shifting between valve open and closed conditions. The valve body includes a handle stop for engagement by stop surfaces on the handle when the valve is disposed in one of the open and closed conditions.

Preferably according to the invention, one of the stem inner end and the valve closure member trunnion includes an axial tang and the other of the stem inner end and the one trunnion includes a tang receiving slot. The tang is received in the slot for interconnecting these two components and comprises the only contact between the stem and valve closure member. Such relationship advantageously prevents any disturbance in the axial located position of the valve closure member within the body central passageway in the event there is slight axial shifting of the operating stem during valve use or operation.

In accordance with one structural embodiment which incorporates the invention, the closure member trunnions include seal means which seal against the side wall of the central passageway. Also, the stem includes a vent opening to vent any fluid bypassing the seal means of the one trunnion in order to maintain the closure member in a pressure balanced condition.

According to still another aspect of the invention, the valve closure member fluid passage includes a portion extending therethrough between the closure member trunnions. In addition, that portion of the central passageway which receives the other trunnion includes means adapted for connecting a fluid line thereto for allowing the valve to accommodate fluid flow between at least three fluid lines.

The principal object of the invention is the provision of a new high pressure ball valve which utilizes a trunnion mounted ball member and plastic seat rings.

Another object of the invention resides in a new high pressure ball valve which minimizes the effective amount of fluid pressure which may act to urge the seat rings into engagement with the ball.

Another object of the invention is the provision of such a ball valve having a fairly simple design which is extremely effective for a high number of shut-off cycles.

Still a further object of the present invention is the provision of a new ball valve which is readily adapted to use in a wide variety of applications and/or environments.

Still other objects and advantages of the invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 1 is a side elevational view of the subject new high pressure ball valve;

FIG. 2 is a cross-sectional view of the valve body;

FIG. 3 is a partial cross-sectional view of the valve closure member;

FIG. 4 is an exploded cross-sectional view of one end fitting, a seat ring carrier and the associated components utilized in the new valve;

DETAILED DESCRIPTION OF THE PREFERRED AND ALTERNATIVE EMBODIMENTS

Figure 5:
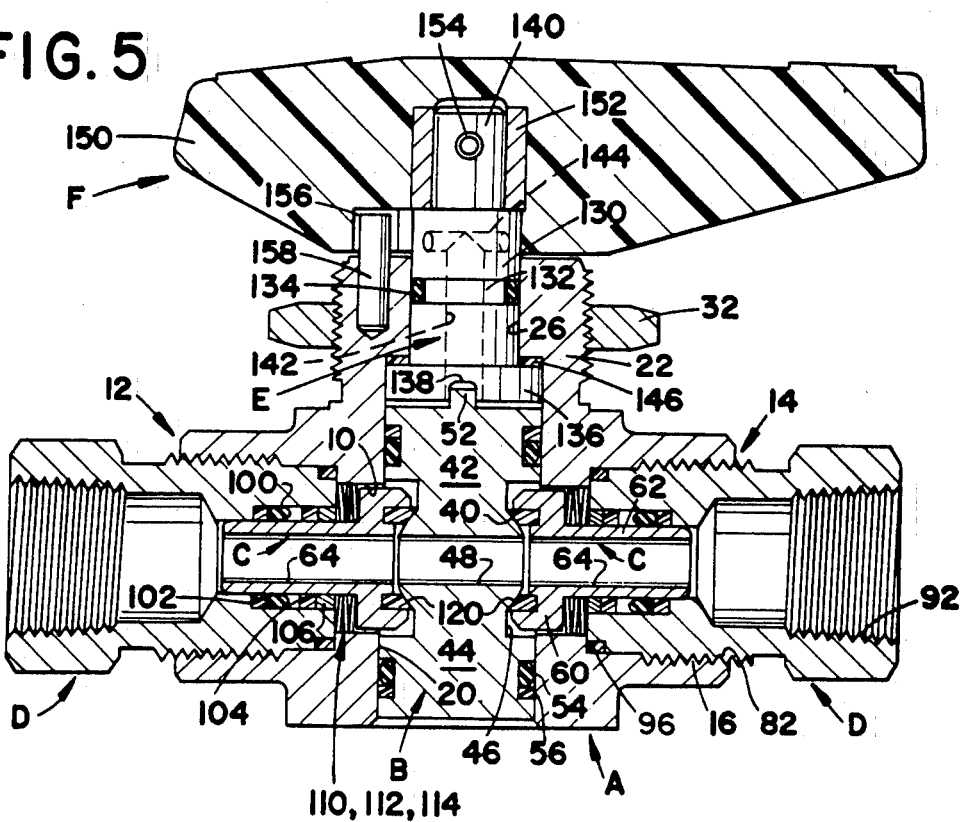
FIG. 5 is a cross-sectional view of the valve shown in FIG. 1.

Referring now to the drawings wherein the showings are for purposes of illustrating preferred and alternative embodiments of the invention only and not for purposes of limiting same, FIGS. 1, 3, 4 and 5 show the new high pressure ball valve as generally being comprised of a valve body A, a closure member B, a pair of seat ring carriers C, a pair of end fittings D, an operating stem E and a handle F.

More particularly, and with primary reference to FIG. 2, valve body A is for a two-way valve and includes a first fluid passageway 10 extending therethrough between branches 12,14. Each branch is internally threaded as at 16 for receiving end fittings D as will become apparent. In addition, each branch includes an outwardly facing radial shoulder 18 spaced axially along first passageway 10 from the outer ends thereof.

A cylindrical second or central passageway 20 extends through body A between an externally threaded bonnet 22 and a lower end 24. This central passageway is disposed generally normal to first passageway 10 and communicates therewith as is shown to define a valve chamber. Central passageway 20 includes a smaller diameter portion 26 adjacent the upper end of bonnet 22 which acts to define a downwardly facing radial shoulder 28. An opening 30 in the upper face of bonnet 22 receives a pin-like handle stop as will become apparent.

Also, a panel nut 32 is received on the external bonnet threads to accommodate valve mounting as is known.

FIG. 3 shows closure member B as including a spherical or ball portion 40 and a pair of cylindrical portions or trunnions 42,44 on opposite sides thereof. The ball portion and trunnions are interconnected at smaller diameter neck areas 46. A fluid passage 48 extends through ball portion 40 transversely of trunnions 42,44 to permit selective control of fluid flow through the valve between branches 12,14 as is conventional.

A centrally located tang 52 protrudes axially outward of closure member B from the end of trunnion 42 for reasons and purposes which will be described. Each of the trunnions includes a circumferential groove 50 having an O-ring 54 and a backup ring 56 received therein. Trunnions 42,44 are dimensioned to facilitate close fitting receipt of closure member B in body central passageway 20 so that the closure member may be selectively rotated in the central passageway to effect valve opening and closing as will be described. When installed, one trunnion of the closure member is disposed on each side of body first passageway 10 with ball portion 40 disposed in the first passageway (FIG. 5). The maximum cross-sectional dimension of the ball portion is less than the diameter of central passageway 20 with O-rings 54 and backup rings 56 acting to prevent fluid leakage between closure member B and body A.

FIG. 4 shows an exploded cross-section of one seat ring carrier C and one end fitting D with associated components. It should be appreciated that one of the structures shown in FIG. 4 is associated with each of valve body branches 12,14 and that both structures are identical unless otherwise specifically noted. More particularly, carrier C includes a cylindrical forward portion or head 60 and a cylindrical tail portion 62 extending coaxially from the head. A fluid flow opening 64 extends through portions 60,62 and an annular shoulder or surface 66 is defined at the interface therebetween. The forward end face of head 60 is bevelled as at 68 and includes an annular seat ring receiving groove 70. The outside diameter of head 60 is slightly smaller than the diameter of body first passageway 10 axially inward of shoulders 18 (FIG. 2).

End fitting D includes a body 80 externally threaded as at 82 for threaded cooperation with threads 16 of branches 12,14 (FIG. 2) as will become apparent. A fluid flow opening extends axially through the body and is comprised of a forward portion 86, a smaller diameter central portion 88 and an enlarged rear portion 90. Rear portion 90 is threaded as at 92 for purposes of receiving a conventional fluid fitting when the valve is installed in a fluid system. A circumferential groove 94 is disposed at the forwardmost end of body 80 and receives a seal 96 to effect fluid sealing between end fitting D and valve body A in the assembled valve. As shown, seal 96 comprises an annular ring machined from a polymeric material. However, the seal may also be comprised of an O-ring, a soft metal or any other suitable seal material.

The diameters of fluid flow opening central portion 88 and carrier tail portion 62 are such that there will be a close guiding relationship therebetween at valve assembly. Flow opening forward portion 86 has a larger diameter than the carrier tail portion and acts to define a cylindrical seal chamber. At valve assembly, tail portion 62 is radially spaced from the side wall of forward portion 86 with appropriate seal means being interposed in the annular area defined therebetween. An annular section of end fitting body forward end face 98 is adapted to engage body first passageway shoulder 18 at valve assembly. This provides a positive forward stop for end fitting D in its mounted relationship with valve body A. The remaining annular section of forward end face 98 defines a shoulder which faces radial surface 66 of seat ring carrier C. There is significant cooperative interplay between these two surfaces as will become apparent hereinafter.

Also included in the carrier C and end fitting D arrangement of FIG. 4 is a seal means for end fitting seal chamber 86. In the preferred arrangement shown, this seal means is comprised of an O-ring seal 100 and a pair of backup rings 102,104 on opposite sides of the O-ring. These elements are dimensioned for receipt in the annular area defined between seal chamber 86 and carrier tail portion 62. In the preferred construction, O-ring 100 and backup rings 102,104 are constructed from polymeric materials. An annular gland 106 is dimensioned for receipt in chamber 86 over carrier tail portion 62. This gland acts to provide a positive stop for back-up ring 104 in the assembled valve and is dimensioned to prevent extrusion of ring 104 therepassed under fluid pressure conditions. At the same time, gland 106 accommodates slight lateral movement of carrier C for reasons to be described.

A plurality of disc springs 110,112,114 are advantageously provided for continuously urging seat rings associated with carriers C into sealing engagement with the surface of spherical or ball portion 40 (FIG. 3) in a manner to be described. Although three such disc springs are shown, it should be appreciated that a greater or lesser number of them may be employed to better accommodate various valve construction details and/or operating parameters. In their unstressed condition as shown in FIG. 4, disc springs 110,112 and 114 have a generally frusto-conical conformation and include a central opening dimensioned to accommodate disc spring receipt over carrier tail portion 62. The outside diameter of the disc springs is slightly less than the diameter of valve body first passageway 10 at the area thereof disposed axially inward of shoulders 18. At assembly, the disc springs are partially stressed toward a flattened condition between the opposed shoulders defined by carrier radial surface 66 and fitting body forward end face 98. As will also be noted, the disc spring which will engage surface 98, viz., disc spring 110 has its smaller diameter end facing toward carrier head 60. This assures that the spring will react against rigid surface 98 and not with gland 106 as would be the case if the smaller diameter end of the disc spring faced away from carrier head 60. The other of the disc springs, viz., springs 112,114, are disposed in alternating positions as shown. Such an alternating relationship is also employed in cases where a greater or lesser number of disc springs is employed. Use of a plurality of disc springs is considered desirable and advantageous for purposes of acting as a tolerance take-up device while still accommodating a carrier biasing function in a manner to be described.

Finally with regard to FIG. 4, an annular seat ring 120 is provided and is dimensioned to be closely positioned in carrier seat ring receiving groove 70. This seat ring may be constructed from any plastic material having those physical characteristics desired for a particular valve application. The seat ring includes a spherical ball portion engaging surface 122 and a narrow annular zone 124 communicates between the seat ring outer periphery and engaging surface 122 to provide additional seat ring strength or support at that area.

In practicing the concepts of the subject invention, it is particularly desirable to have full surface contact between seat ring engaging surface 122, i.e., between engaging surface inner and outer diameters 126,128 and ball portion 40 of closure member B. In this desirable mode, the seat ring engaging surface thus contacts the ball portion by an annular contact or engaging band defined between inner and outer diameters 126,128. Outer diameter 128 is greater than the outside diameter of the associated carrier tail portion 62. With this relationship, and when seat ring 120 is positioned downstream from ball portion 40, fluid pressure will urge carrier C toward the ball portion so that the seat ring, in turn, will be further urged against the ball portion to thereby enhance its sealing function. Inner diameter 126 is less than the diameter across the associated seal chamber 86. As a result, when seat ring 120 is positioned upstream from the ball portion, fluid pressure will again urge carrier C toward the ball portion to enhance the seat ring sealing function. Therefore, regardless of the position of the seat ring with respect to fluid flow, and independent of the other seat ring in the overall valve assembly, fluid pressure will act in conjunction with the disc springs to urge the carrier toward the ball portion for enhancing the seat ring sealing function.

In actual practice, however, because of component tolerances, it is difficult to precisely match spherical seat ring engaging surface 122 and ball portion 40 for obtaining full surface contact therebetween, at least at the initial valve assembly. Upon such assembly, the seat ring engaging surface and the ball portion will typically form a line contact circumscribing ball portion fluid passage 48 (FIG. 3) at a diameter between inner and outer diameters 126,128. In order to insure that the seat rings properly seal in any case or situation of seat to ball contact, it is necessary to set the dimensions of both components so that as the seat ring engaging surface is brought into contact with the ball portion by assembly of the components, engaging surface 122 first contacts the ball portion with a line contact at or adjacent to engaging surface outer diameter 128. Since this outer diameter is set smaller than the diameter across the associated seal chamber 86, the carrier is still urged by fluid pressure toward the ball portion when upstream therefrom. Conversely, if the dimensions of both the seat ring engaging surface and ball portion were set such that the seat engaging surface first contacts the ball portion with a line contact at or adjacent to engaging surface inner diameter 126 at initial assmebly of the components, fluid pressure may actually urge carrier C away from the ball when it is in the downstream position. This unacceptable result may occur since the engaging surface inner diameter may not be greater than the outside diameter of the associated carrier tail portion 62.

Accordingly, and to insure that engaging surface 122 will always first contact ball portion 40 with a line contact at or adjacent engaging surface outer diameter 128, the spherical shape of the engaging surface has a radius smaller than the radius of the ball portion (FIG. 3). The difference between the radii of seat ring engaging surface 122 and ball portion 40 must be small enough such that an appreciable contact or engaging band width, e.g., approaching the desirable full annular band between seat ring inner and outer diameters 126,128, is generated with the application of low fluid pressres or by the force provided by disc springs 110,112 and 114. The difference in radii may also vary somewhat as a function of the particular seat ring material employed and/or other operating parameters.

Thus, once valve assembly is completed, the initial line contact between engaging surface 122 and ball portion 40 is automatically widened approaching the desirable full annular contact band from outer diameter 128 toward inner diameter 126 by ensueing spring and fluid pressure loads. Such loads cause the plastic seat material to deform against the ball. The engaging relationship between the seat ring engaging surface and ball portion is further enhanced by wear of the plastic seat ring material caused by cycling the valve assembly.

Moreover, in the desirable mode of full surface contact between seat ring engaging surface 122 and ball portion 40, the subject invention limits the compressive force which could otherwise destructively crush the seat material. When the seat ring is located in an upstream position, compressive force is caused by the action of fluid pressure in the annular area defined between the diameter across the associated seal chamber 86 and inside diameter 126 of the seat ring engaging surface. When the seat ring is located in a downstream position, this compressive force is caused by the action of fluid pressure in the annular area defined between outside diameter 128 of the seat ring engaging surface and the outside diameter of the associated carrier tail portion 62. Specifically, the ratio of this annular area to the projected annular area of seat ring engaging surface 122 between diameters 126,128 is equal to the ratio of the fluid pressure to the compressive stress on the seat. Thus, in practicing the concepts of the subject invention, these annular areas are adjusted such that common plastics may be safely used as seat materials and effectively seal against high fluid pressures.

FIG. 5 best shows the structural arrangements for stem E and handle F. More particularly, the stem includes a cylindrical body portion 130 closely rotatably received in smaller diameter portion 26 of body central passage 20. This body portion has a circumferential groove 132 which includes a polymeric or elastomeric journal bearing 134. This bearing inhibits metal to metal sliding contact between the stem and valve body as the stem is rotated. This then reduces operating torque and provides the valve with a smooth-to-the-touch feel upon operation. The bearing also fills the gap between the stem and central passageway 20 to eliminate any looseness at the handle. A radially outward extending flange 136 having a circular cross-section of a diameter slightly less than the diameter of body central passageway 20 is provided at the stem inner end. A lateral groove 138 is included in the end face of flange 136 to receive tang 52 of valve closure member B and thus place the stem and closure member in cooperative engagement with each other. Stem E further includes an outer or handle receiving end 140 disposed outwardly of the valve body adapted to receive handle F. A leak port 142 extends axially of the stem from the end face of flange 136 toward stem outer end 140. Radial cross branches 144 communicate with port 142 at a location disposed externally of the valve body. The leak port insures expeditious venting to atmosphere of any leakage of fluid pressure that might pass O-ring seal 54 on trunnion 42. Without this vent, such leakage could build up pressure between stem E and closure member B and thus urge the closure member outwardly of central passageway 20 at body end 24.

An annular stem bearing 146 is advantageously interposed between end flange 136 and central passageway shoulder 28 to better facilitate ease of stem rotation. The metal-to-metal contact which would otherwise be present would render valve opening and closing more difficult and require more torque. In the preferred arrangement shown, this bearing merely comprises an annular ring constructed from, for example, polytetrafluoroethylene.

Handle F includes a handle body 150 which, in the preferred construction, is molded from phenolic plastic. The handle body may take any number of different or detailed configurations and includes an opening in the underside thereof for accommodating installation onto handle receiving end 140 of the stem. This opening includes a cylindrical metallic insert constructed from brass or the like which closely embraces handle receiving end 140. A dog point set screw 154 extends through the handle body, insert and stem receiving end 140 for maintaining a fixed association between handle F and stem E.

A stop 158 which takes the form of a pin or the like is received in body opening 30 and is dimensioned to extend a short distance upwardly from the outer face of valve body bonnet 22. Handle body 150, in turn, advantageously includes a pair of arcuately spaced apart handle stops in an enlarged area of the handle opening. One such stop is designated by numeral 156 in FIG. 5 and the pair of stop surfaces in combination with stop 158 limit handle rotation to between a pair of predetermined maximum rotated positions. The mounting of the handle to the stem, the stem relationship to the ball closure member, the location of pin 158 and the locations of the handle stop surfaces are coordinated so that when one of the handle stops is in engagement with pin 158, the valve will be disposed in the fully opened position as shown in FIG. 5. When the handle is rotated so that the other stop surface engages pin 158, the ball closure member will be moved to a valve closed position wherein closure member B is rotated approximately 90° relative to the fully opened position shown.

Figure 6:
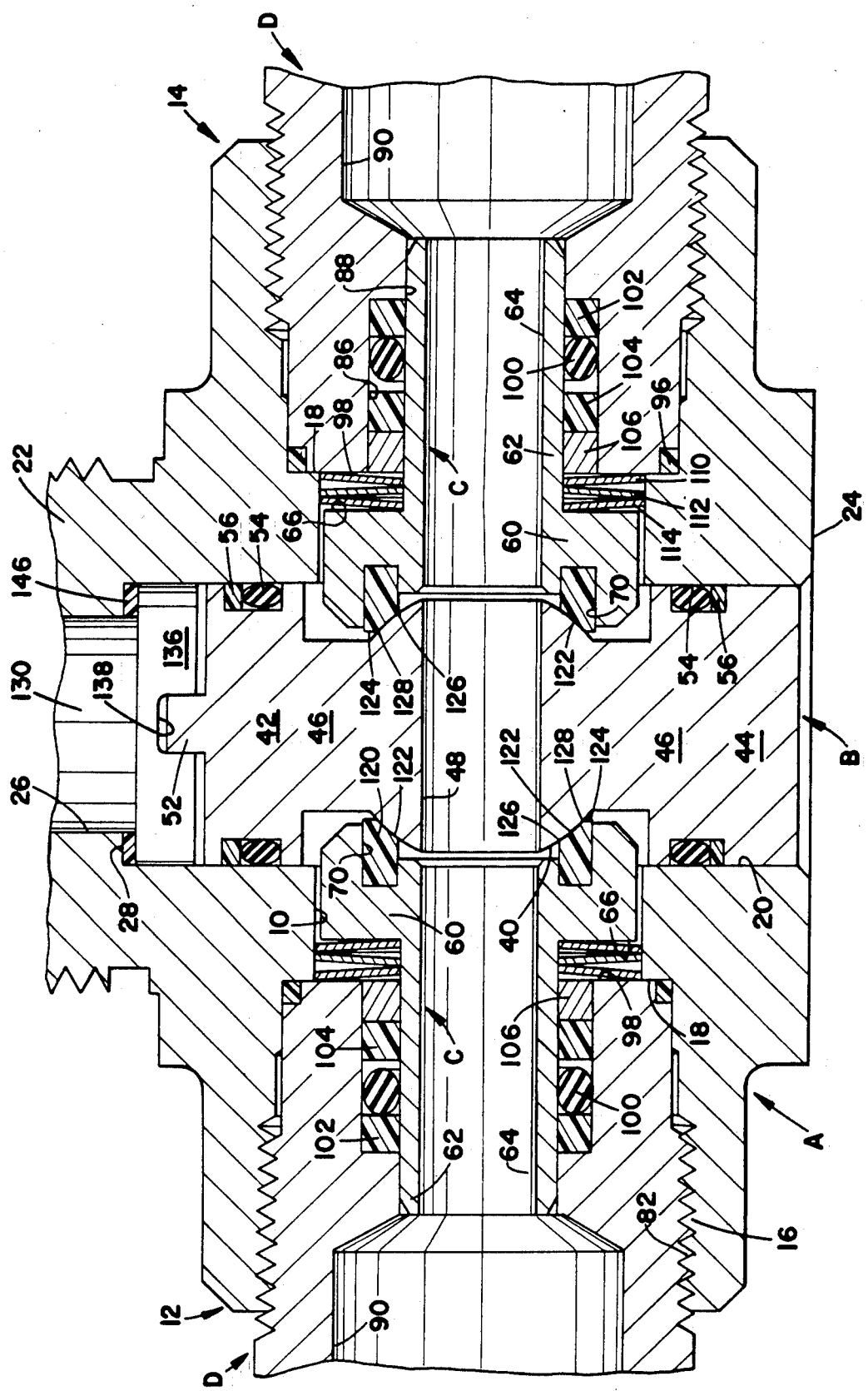
FIG. 6 is an enlarged view of a portion of the valve shown in FIG. 5 for better illustrating the cooperative relationships between the seat rings, seat ring carriers, seal means, disc springs and end fittings.
Figure 8:
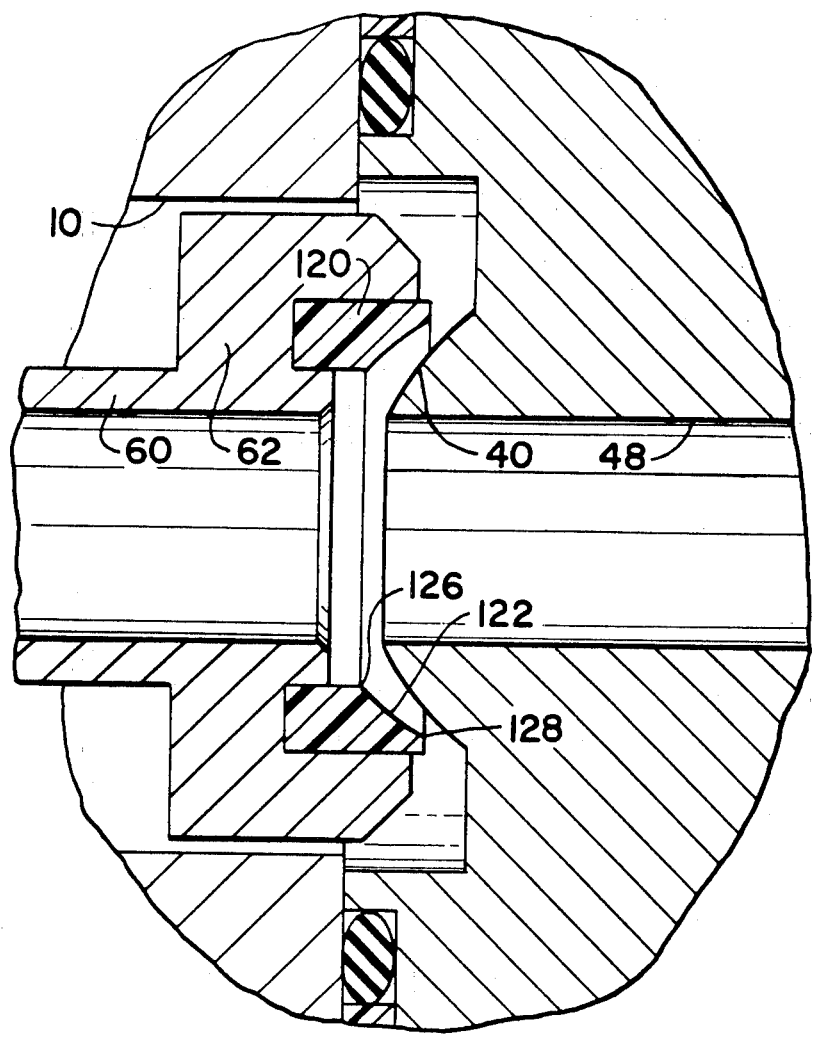

FIGS. 5 and 6 provide the best reference for the following discussion on valve assembly. In particular, stem E with stem bearing 146 is first inserted into central passageway 20 of valve body A from lower end 24 thereof. Bearing 134 advantageously functions between the stem and the side wall of the central passageway in the manner previously described. Handle F may then be installed if desired for retaining the stem positioned in the valve body. Valve closure member B is next inserted into central passageway 20 in such a manner that tang 52 is received in groove 138.

It should be noted that the end face of stem flange 136 does not directly engage the upper face of the valve closure member and that a connected relationship between these two components is effected solely between tang and receiving groove. The foregoing relationship is provided and maintained by dimensions held on the stem, the closure member, the valve body and the handle. If direct engagement between the stem and closure member is not prevented except at the interconnection between tang 52 and groove 138, the stem and handle could be pushed by hand into the valve and, upon flange 136 engaging the upper face of the closure member, push ball portion 40 out of sealing contact with seat rings 120.

O-rings 54 and backup rings 56 carried by trunnions 42,44 act to prevent fluid bypass between the walls of central passageway 20 and valve closure member B when the valve is placed in a fluid system. Ball portion 40 has a smaller diameter than body central passageway 20 and is received in the valve chamber defined at the intersection of passageways 10,20.

Carriers C and end fittings D shown in FIG. 4 may then be assembled and installed into valve body branches 12,14 as shown in FIG. 5 with external threads 82 of the end fittings engaging internal threads 16 of the valve body. When each end fitting is fully inserted into the body, forward end face 98 thereof will engage the associated one of valve body shoulders 18. Seals 96 will prevent fluid by-pass between the end fittings and valve body.

The components included in the carrier and end fitting subassemblies are dimensioned such that when the end fittings are fully inserted into the valve body, disc springs 110,112 and 114 will be partially stressed toward a flattened condition between shoulder faces 66,98. Such stressing will, in turn, act to urge carriers C toward closure member B with the seat ring engaging surfaces 122 contacting ball portion 40. Neck areas 46 on each side of the spherical portion accommodate this relationship. As previously noted, the seat ring engaging surfaces each have a slightly smaller radius than the radius of the ball portion. Moreover, the dimensions of the engaging surfaces and closure member are set so that at assembly, engaging surfaces 122 first contact ball portion 40 with at least a line contact at or adjacent engaging surface outer diameter 128. The spring force of the disc springs acting on carriers C causes seat ring deformation so that the area of engagement between engaging surfaces 122 and ball portion 40 is widened toward the desired full annular engaging band from outer diameter 128 to inner diameter 126.

The use of multiple disc springs for biasing each of carriers C is also desirable to accommodate minor tolerance variations which may be present in the valve components. Dimensioning of the valve components is such that the springs are, at worst, fully stressed to a flattened condition, but never beyond, between shoulders 66,98. Preferably, the disc springs are only partially stressed and are never loose. While the valve construction shown employs three disc springs cooperating with each carrier C, it will be appreciated that use of a greater or lesser number of such springs may be desired for different valve sizes and/or to accommodate various operating parameters.

Valve closure member B is retained in valve body central passageway 20 through engagement of the seat ring engaging surfaces with the ball portion. Because of the dimensional relationships between carriers C, end fittings D and the associated components, the carriers may shift slightly relative to the end fittings so that seat rings 122 sealingly engage ball portion 40 as described above with the center of ball portion 40 being located at the intersection of the longitudinal axes of valve body first and central passageways 10,20. This feature thus accommodates slight tolerance variations which may be present in the components. In addition, valve closure member B may float slightly within body central passageway 20 to facilitate proper seat ring-ball portion alignment and eliminate the potential for operational difficulties on account of manufacturing tolerances.

Backup ring 102 associated with each carrier-end fitting is rigidly supported at the shoulder-like interface between end fitting flow opening portions 86,88 and backup ring 104 is similarly supported by gland 106.

Backup rings 102,104 are axially spaced apart from each other in seal chamber 86 by a distance greater than the transverse cross-sectional dimension of O-ring 100 in order that the O-ring may float as a function of the direction of fluid pressure acting thereagainst to prevent fluid by-pass between the carriers and their associated end fittings.

With the above described two-way valve connected with a fluid system at branches 12,14 and with valve closure member B in a valve closed condition, i.e., with the closure member rotated 90° from the views of FIGS. 5 and 6, system fluid will pass through the interior of the inlet or upstream branch end fitting and carrier to act against ball portion 40. Because of the carrier configuration, fluid pressure will act on the ball to the inside diameter of engaging surface contact with the ball portion. At the same time, fluid pressure will act on the outer end of carrier tail portion and will pass between the carrier tail portion and end fitting to act against upstream O-ring 100 to urge it forwardly against backup ring 104. As a result of the foregoing conditions, the total area under pressure for producing the force on closure member B which is carried entirely by trunnions 42,44 is defined by the total area across upstream seal chamber 86. This force is quite large and, if not carried by trunnions 42,44, would apply a destructive load on the downstream seat ring. With the subject invention, however, closure member B is supported by the trunnions so that it may not move axially of valve body first passageway 10.

In accordance with the subject invention, the conformation of carriers C with seat rings 120, seal chambers 86 and end fittings D are such that the upstream seat ring seals the valve in a valve closed condition. In addition to the cooperative relationship between the components themselves, particularly the relationship between seat ring engaging surface 122 and ball portion 40 and the action of disc springs 110,112 and 114, some fluid pressure will act to exert a force for urging the upstream seat ring into sealing engagement with the closed ball portion. Such force will enhance or increase the amount of seat ring engaging surface 122 contacting the ball portion, i.e., increase the width of the engaging band from seat ring outer diameter 128 toward inner diameter 126. In the preferred sealing mode, full surface contact between these two diameters is desired in a manner previously described.

The area which provides the net force of fluid pressure acting on upstream seat ring 120 is limited to the annular area defined by the outer diameter of upstream seal chamber 86 and the inside diameter of sealing contact between the upstream seat ring engaging surface 122 and the ball portion 40. This is a relatively small area and the seat ring does not experience any destructive compressive forces or stresses. The foregoing dimensional characteristics may be varied as desired to increase or decrease the annular area involved and thus increase or decrease the net force of fluid pressure acting on the upstream seat ring. In this manner, the amount of seat stress which will be encountered may be tailored to a particular plastic seat material. In accordance with the invention, it is desired that the upstream seat ring perform the entire sealing function in the valve closed condition. Therefore, and if there is no fluid leakage at the upstream seat ring, the downstream seat ring could be removed from the valve body with no adverse affects.

As the valve is moved from the closed to the opened position shown in FIGS. 5 and 6, system fluid will enter closure member passage 48 and pass into the valve chamber between valve closure member B and carriers C. O-rings 54 acting against backup rings 56 provide a fluid seal in valve body central pssageway between valve body A and closure member B. System fluid will also migrate between both the downstream and upstream end fittings D and the carriers C on both sides of the associated O-rings 100. Because of the conformation of the carriers and the positioning of seat rings 120 relative thereto, fluid pressure forces will act to urge each of the carriers toward the closure member. Here, however, the area which provides the net force of fluid pressure acting on both the upstream and downstream seats is generally limited to the projected annular area defined by that portion or band of seat ring engaging surfaces 122 which are in sealing engagement with ball portion 40. When the valve is again returned to the closed condition, no momentary fluid leakage will occur at the upstream seat ring since it is always maintained in a sealing relationship with ball portion 40.

After some period of valve usage, seat ring engaging surfaces 122 will more precisely conform to the surface of spherical or ball portion 40 to thereby increase the annular area of sealing contact therebetween. Such change will enhance the overall seat ring sealing characteristics and any wear or changes occurring in seat ring engaging surfaces 122 will be automatically compensated for by the plurality of partially stressed disc springs 110,112 and 114.

In the event a fluid leak should occur at the upstream seat ring when the valve is in the closed condition, downstream seating by the downstream seat ring will prevent fluid leakage outwardly through the downstream branch of the valve body. In that case, fluid pressure will urge the downstream carrier C toward closure member B to enhance or increase the degree of sealing contact between the downstream seat ring 120 and ball portion 40. Under this condition, the area which provides the net force of fluid pressure acting on the downstream seat ring comprises the annulus defined between the outer diameter of sealing contact by the downstram seat ring engaging surface with the ball portion and the outer diameter of the associated carrier tail portion 62.

Closure member B is, of course, positioned in valve body central passageway 20 solely by the action of seat rings 120 being urged against ball portion 40. The O-ring 54 and backup ring 56 disposed in groove 50 of each trunnion 42,44 prevent fluid pressure from within the valve body interior, i.e., at the area of the ball portion, to pass outwardly therefrom between the trunnions and central passageway 20. Because of this structural relationship, the closure member is pressure balanced and is not urged by fluid pressure either further into or out of the central passageway. This feature is important because it renders the valve blowout proof in two ways. First, there is no unbalanced pressure force to urge the closure member out of the bottom of the valve body. Second, should an O-ring leak occur at trunnion 42, and should leak port 142 be plugged and not vent this leakage as previously described, the closure member is still trapped between the opposed seat rings 120. As a result, while the seat rings may leak because the ball is urged out by pressure, the valve closure member is held by the seat rings and will not blow out.

Figure 7:
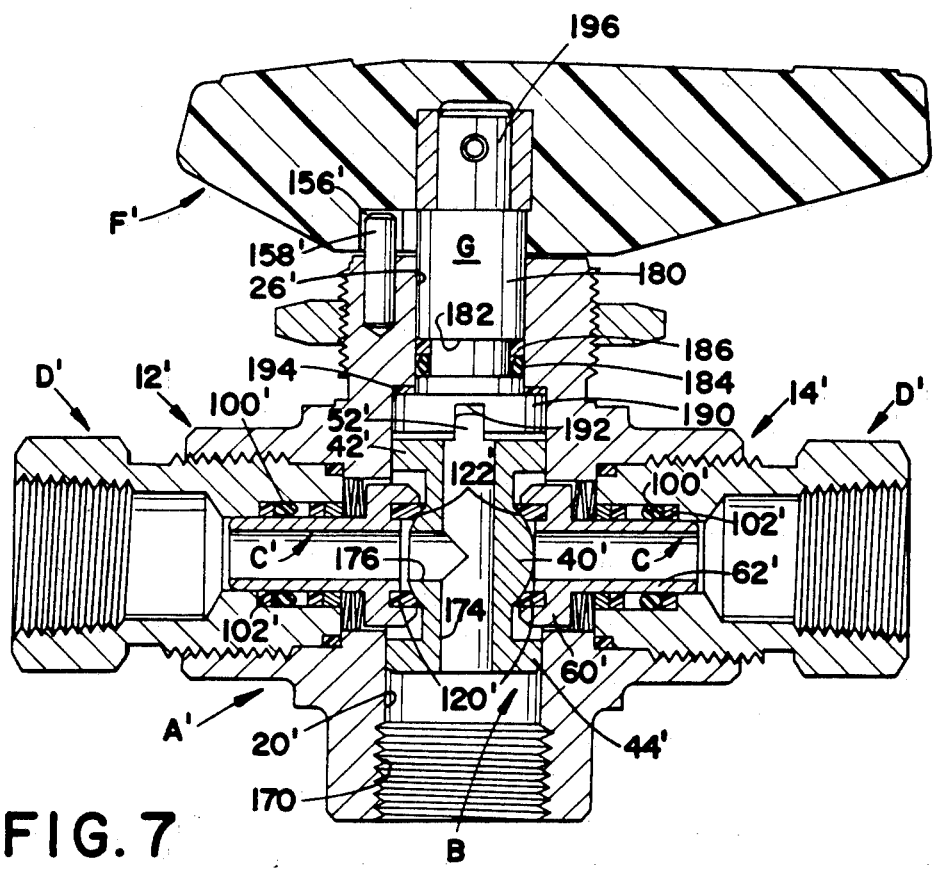
FIG. 7 is a cross-sectional view similar to FIG. 5 showing an alternative valve construction which incorporates the concepts of the subject invention, and, FIG. 8 is an enlarged cross-sectional view of a portion of the valve with a seat ring carrier shown in a slightly retracted position from the ball portion for showing the relationship between the radii of the ball portion and the seat ring engaging surface in accordance with the invention.

FIG. 7 shows a modified valve construction which incorporates the concept of the subject invention thereinto. For ease of illustration and appreciation of this alternative, like components are identified by like numerals with a primed (') suffix and new components are identified by new numerals.

More particularly, FIG. 7 shows a three-way ball valve wherein central passageway 20' in valve body A' is threaded as at 170 to define a third valve body branch. This third branch is adapted to have a fluid system line affixed thereto by a conventional fitting.

Valve closure member B' is also slightly modified in that cylindrical portions or trunnions 42',44' do not include any seal means for sealing against the side wall of valve body central passageway 20'. In addition, the fluid passage extending through the closure member is comprised of a first portion 174 extending axially through the valve closure member between trunnions 42',44' and a second portion 176 extending radially of ball portion 40' in communication with first portion 174. This arrangement thus allows a fluid line associated with the valve body at threaded area 170 to be selectively placed in fluid communication with each of branches 12',14'. The stop surfaces on handle F also require modification to accommodate the necessary rotational capabilities for closure member B'.

In this particular alternative embodiment, a different stem G is employed. Specifically, the stem includes a solid cylindrical body portion 180 closely rotatably received in smaller diameter portion 26' of the central passageway. A circumferential groove 182 on this body portion receives an O-ring seal 184 and a backup ring 186 to effect stem sealing in the central passageway. This sealing is important since trunnion 42' does not include any seal means and system fluid would otherwise be permitted to escape between the stem and central passageway.

A radially outward extending flange 190 having a circular cross-section of a diameter slightly less than central passageway 20' is provided at the stem inner end. A lateral groove 192 is included in the end face of flange 190 to receive tang 52' of the valve closure member in the same manner previously described to place the stem and closure member in cooperative engagement with each other. An annular stem bearing 194 is interposed between flange 190 and the central passageway shoulder to better facilitate ease of stem rotation.

Stem body portion 180 further includes an outer or handle receiving end 196 disposed outwardly of the valve body adapted to receive handle F' in the manner previously described. When the valve is assembled as shown in FIG. 6, the dimensions held on the stem, the closure member, the valve body and the handle prevent the end face of flange 190 from directly engaging the upper face of the valve closure member. The connected relationship between these two components is effected solely between tang 52' and receiving groove 192. This relationship prevents any pushing of the stem into the valve from disturbing the sealed contact or relationship between seat rings 120' and ball portion 40' as could otherwise occur when flange 190 engaged the upper end of the closure member.

When the three-way valve of FIG. 7 is installed in a fluid system so that the branch defined at threaded area 170 comprises the upstream or inlet branch, and with closure member B' rotated to a valve closed position, system fluid will be prevented from exiting the valve at either of branches 12',14'. In this particular installation, the seat rings associated with each of valve body branches 12',14' function as downstream seats. System fluid will pass through fluid passage first and second portions 174,176 into the valve chamber and will migrate between central passageway 20' and trunnions 42',44' so as to substantially fill the valve chamber radially outward of the outer diameter of sealing contact between seat ring engaging surfaces 122' and ball portion 40'. At the same time, fluid will migrate around and between seat ring carriers C' and end fittings D' up to the area of O-rings 100' to urge the O-rings against backup rings 102'. In the capacity of downstream seats, fluid pressure will urge both of carriers C' toward closure member B' to enhance or increase the degree of sealing contact between engaging surfaces 122' of seat rings 120' and ball portion 40'. The area which provides the net force of fluid pressure acting on the seat rings is provided by the annular area between the outer diameter of sealing contact by the seat ring engaging surfaces with the ball portion and the outer diameter of the associated carrier tail portion 62'.

When the valve is opened to the position shown in FIG. 7, system fluid may pass through the valve and exit from branch 12'. System fluid pressure will still act to urge both seat rings toward engagement with the ball portion. The area which provides the net force of fluid pressure against the seat ring associated with branch 12' is generally equal to the projected area of contact between the seat ring engaging surface and the ball portion. The net force of fluid pressure acting on the seat ring associated with branch 14' remains substantially the same as described above for the valve closed condition.

The three-way valve shown in FIG. 7 may also be installed in a fluid system so that one of branches 12',14' comprises the upstream or inlet branch with the other of branches 12',14' and branch 170 comprising downstream branches. In that case, and with the valve in the closed condition, the seat ring associated with the inlet branch will function as an upstream seat in the same manner previously described above with reference to FIGS. 5 and 6. Thus, the upstream seat ring will desirably perform the entire sealing function and will experience a net fluid pressure force urging it into sealing engagement with ball portion 40'. As before, the area which provides the net force of fluid pressure acting on the upstream seat ring is the annular area defined by the diameter across the associated seal chamber 86' and the inside diameter of sealing contact between the upstream seat ring engaging surface and ball portion 40'.

When the valve is moved to the open condition of FIG. 7, and with branch 12' comprising the inlet branch, seat ring 120' associated with this branch continues to function as an upstream seat. However, due to system fluid migration inside the valve, the area which provides the net force of fluid pressure acting against the seat ring in urging it into contact with the ball portion is generally equal to the projected area of seat ring engaging surface contact with the ball portion. Seat ring 120' associated with branch 14' will continue to function as a downstream seat which experiences a net fluid pressure force urging it into sealing engagement with the ball portion.

While the arrangement shown in FIG. 7 is for a three-way valve, it should be appreciated that the valve body may be configured to include additional branches so that a four or even five-way valve may be advantageously provided. Such modifications do not, however, in any way depart from the overall intent or scope of the present invention.

When using the subject new high pressure ball valve concept described in detail hereinabove, substantially higher pressure ratings for a valve employing plastic seat rings are realized. In that regard, the valve may be rated and used with pressures of up to 6000 psi without damaging any of the internal valve components. This rating is substantially higher than prior known ball valves utilizing plastic seats or seat rings. In addition, the subject new valve construction is relatively simple in design and utilizes a plurality of interchangeable components. Thus, the basic valve concept is adaptable to use in a wide variety of specific valving applications in a broad range of environments. Moreover, the subject new valve construction allows the seat ring stress to be tailored or controlled for accommodating particular seat ring materials. These capabilities comprise substantial improvements over many prior valves having high pressure capabilities.

The invention has been described with particular reference to preferred and alternative embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A high pressure ball valve comprising:
   a valve body having a cylindrical first flow passageway and a cylindrical central passageway extending therethrough in a generally normal relative relationship and in communication with each other, the opposite ends of said first passageway defining a pair of valve body branches;
   a valve closure member received in said central passageway and being selectively rotatable about the central passageway axis, said closure member having a spherical ball portion disposed in said first passageway and a pair of cylindrical trunnions disposed on opposite sides of said ball portion in said central passageway, said ball portion including a fluid passage therethrough and one of said trunnions including means for connecting said closure member to control means, that portion of said central passageway receiving the other of said trunnions defining a third valve body branch;
   control means in operative communication with said valve closure member connecting means for allowing selective rotation of said closure member to move said fluid passage in said ball portion between valve open and closed conditions;
   a pair of radially inward extending annular shoulders in said first passageway located generally equal distances from said ball portion, each said shoulder being circumferentially continuous and having a surface normal to the axis of said first passageway facing said ball portion;
   a pair of seat ring carriers disposed in said first passageway with one of said carriers positioned at each area of communication of said first passageway with said central passageway, each carrier including an axial fluid flow opening therethrough and a radially outward extending annular face compatible with and facing the said surface of an associated one of said shoulders, said carriers each further including an annular seat ring receiving groove facing said ball portion and a cylindrical tail portion extending axially of said first passageway away from said ball portion in a radially inwardly spaced relation to said first flow passageway to form a cylindrical seal chamber;
   a plurality of partially stressed disc springs interposed between each shoulder surface and the annular face of the associated carrier for urging said carriers axially of said first passageway toward said ball portion, each disc spring having a central opening and in its unstressed condition having a truncated conical shape, said disc springs being positioned so that the smaller diameter ends of alternating ones thereof face in opposite directions;
   a deformable annular seat ring closely received in the seat ring receiving groove of each carrier with said seat rings each including a continuous engaging surface facing said ball portion and wherein said engaging surface has a spherical conformation in its unstressed condition of a radius less than the radius of said ball portion, said seat ring engaging surfaces being urged into sealing contact so that said surfaces first contact with said ball portion at about the outer diameter of said surfaces during assembly and such contact widening from the outer diameter radially inwardly toward the inner diameter of said surfaces under the influence of said disc springs and fluid pressure loads, said sealing contact occurring at least at a diameter across the engaging surface of each seat ring which is smaller than the diameter across the associated seal chamber, said seat rings locating said closure member ball portion in said first passageway and retaining said closure member in said central passageway;
   seal means interposed between each carrier tail portion and the valve body, in the associated seal chamber, and said seal means each including at least one annular seal ring adapted to be axially shifted between defined limits in response to fluid pressure exerted thereagainst; and,
   said third branch comprising an upstream branch and said pair of seat rings comprising downstream seat rings with fluid pressure contacting either of said carriers adapted to further urge the associated seat ring toward engagement with said ball portion, the area which provides the net force of fluid pressure for such further urging being limited to a predetermined annular area defined between the outside diameter of the engaging band on each seat ring and the outside diameter of the associated carrier tail portion for preventing the application of destructive compressive loads to the seat rings.

2. The ball valve as defined in claim 1 wherein each seat ring engaging surface contacts said ball portion by an annular engaging band, said band having an outer diameter greater than the outside diameter of the associated carrier tail portion and an inside diameter which is less than the diameter across the associated seal chamber.

3. The ball valve as defined in claim 1 wherein in said valve open condition with said third branch in communication with one of said pair of branches, said predetermined annular area for the seat ring associated with said one branch comprises the projected area of said one branch associated seat ring annular engaging band.

4. The ball valve as defined in claim 1 wherein the ones of said disc springs cooperating directly with said shoulder surfaces have the smaller diameter ends facing said ball portion.

5. The ball valve as defined in claim 1 wherein said shoulders and seal chambers are defined by removable end fittings received in said first passageway.

6. The ball valve as defined in claim 5 further including an annular carrier gland interposed between each carrier tail portion and the side wall of the associated seal chamber, each gland accommodating slight transverse shifting of the associated carrier to facilitate a locating action by said seat rings against said ball portion.

7. The ball valve as defined in claim 6 wherein each seal means further includes a pair of annular backup rings having said seal ring interposed therebetween, said backup rings having an axially spaced relationship to each other greater than the transverse cross-section of said seal ring and establishing said defined limits.

8. The ball valve as defined in claim 1 wherein said closure member trunnions each include a circumferential groove having sealing means disposed therein in sealing cooperation with the side wall of said central passageway.

9. The ball valve as defined in claim 8 further including a backup ring received in each trunnion groove on the side of said seal means remote from said ball portion.

10. The ball valve as defined in claim 9 wherein said closure member is pressure balanced in said central passageway by system fluid passing through said valve, whereby there are no pressure forces tending to urge the closure member outwardly from the valve body central passageway.

11. The ball valve as defined in claim 1 wherein said control means comprises an operating stem rotatably received in said central passageway and having an outer end disposed outwardly of said body, said operating stem including a radially outward extending circumferential flange adjacent the stem inner end cooperable with a radially inward extending flange in said central passageway for preventing withdrawal of said stem from said central passageway in the direction of said stem outer end.

12. The ball valve as defined in claim 11 further including stem bearing interposed between said stem flange and central passageway shoulder.

13. The ball valve as defined in claim 11 further including a stem seal sealingly interposed between said stem and said central passageway.

14. The ball valve as defined in claim 11 further including a journal bearing interposed between said stem and central passageway for inhibiting metal to metal sliding contact between said stem and the side wall of said central passageway when said stem is rotated for moving said closure member between said valve open and closed conditions.

15. The ball valve as defined in claim 11 wherein said stem further includes a vent opening extending axially thereof from the end face of said flange toward said stem outer end and communicating with at least one radial cross hole in said stem disposed externally of said valve body, said vent opening allowing system fluid bypassing said one trunnion to vent to atmosphere and prevent the exertion of unbalanced pressure forces against said closure member in said central passageway.

16. The ball valve as defined in claim 11 wherein a control handle is secured to said stem outer end with said handle including arcuately spaced apart stop surfaces, said valve body including at least one handle stop engagable by said stop surfaces when said handle is moved between preselected rotated positions defining said valve open and closed conditions.

17. The ball valve as defined in claim 11 wherein one of said valve stem inner end and said valve closure member one trunnion includes an axial tang and the other of said stem inner end and one trunnion includes a tang receiving slot, said tang being received in said slot for interconnecting said stem with said valve closure member and comprising the only contact between said stem and closure member, whereby the located relationship of said closure member ball portion by said seat rings will not be disturbed by limited axial movement of said stem.

* * * * *